Patented May 7, 1929.

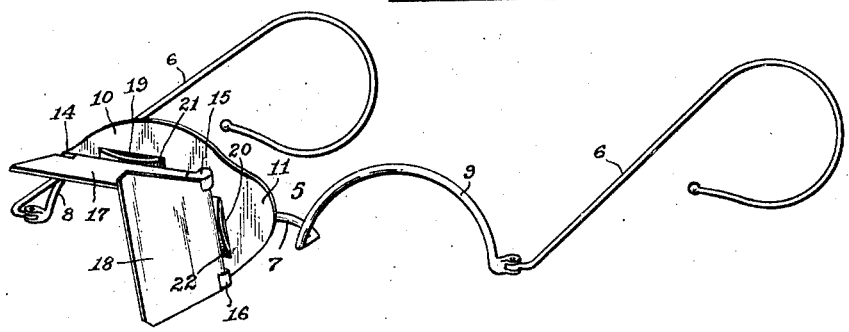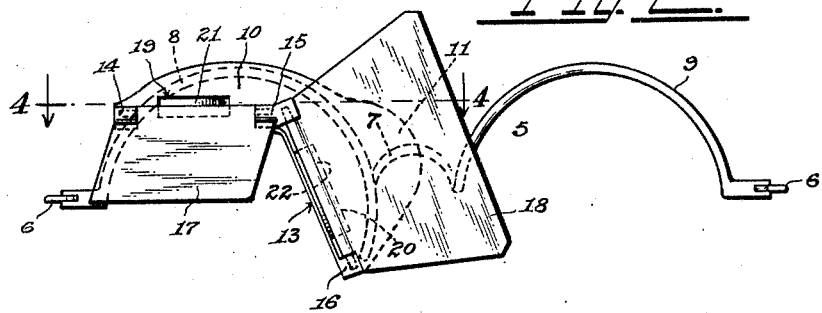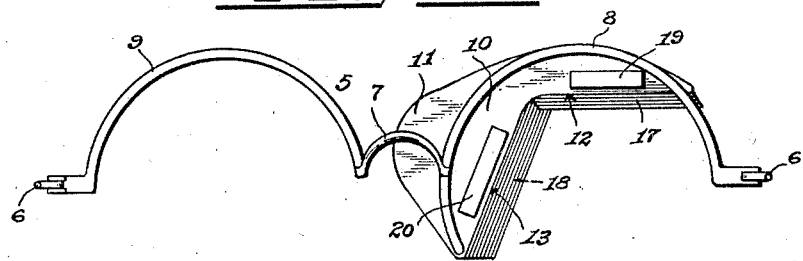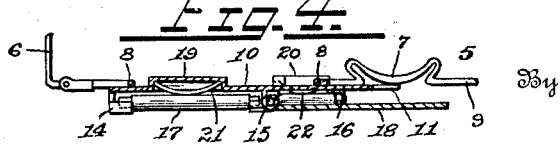

1,712,285

UNITED STATES PATENT OFFICE.

OLAF WESTGAARD AND LEVI WESTGAARD, OF SEATTLE, WASHINGTON.

EYESHADE FOR AUTO DRIVERS.

Application filed May 17, 1928. Serial No. 278,522.

Our invention relates to eye shades for auto drivers and is an improvement over our prior patent of the same title, Number 1,653,139, and issued December 20, 1927. Certain objects of our present invention are to provide an eye shade having one shade member pivotally mounted on a frame-plate in a slanting position for intercepting the glare of the headlights on vehicles passing to the left, and another shade member pivotally secured to the frame-plate in a horizontal position for eliminating the reflected rays of light from the mirror and also for shutting out the sun's rays or other overhead rays of light from ahead. Other objects are to provide adjustable means whereby both of said shade members will be retained in the positions in which they are placed. Further objects are to provide an eye shade of simple, durable and inexpensive construction and which may be folded flat for carrying in a pocket case.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in front perspective of our eye shade with both shade members in operative position;

Fig. 2 is a view in front elevation of the same with both shade members folded;

Fig. 3 is a view in rear elevation showing the shade members in operative position; and Fig. 4 is a view in longitudinal section taken substantially on a broken line 4, 4 of Fig. 2.

Referring to the drawings throughout which like reference numerals designate like parts, the numeral 5 indicates a frame having the usual temple members 6, bridge 7, right rim 8, and left rim 9. Said rims are preferably made in semi-circular design as shown in the drawings although we do not limit ourselves to any particular form or shape of rims.

A frame-plate 10 is brazed, soldered, or otherwise fixed to the right rim 8. Said frame-plate has a rounded bulging portion 11 at its inner end which overlaps the bridge 7 and projects slightly beyond the center of same as clearly shown in the drawings. When the device is positioned on the wearer this rounded projecting end portion is adapted to fit snugly against the fleshy portion of the eye-socket corner where the brow joins the nose and thus prevents any light from entering at this point. It may here be stated that we sometimes secure the bridge 7 directly to the frame-plate 10 or make same an integral part thereof thus eliminating the right rim 8 entirely.

The frame-plate 10 is cut away in a horizontal direction at 12 and in a downwardly and inwardly slanting direction at 13. A single annular socket 14 is formed on the outer end portion of said frame-plate and a two-way socket 15 is also provided on said plate adjacent the corner of its cut away portion. Another single annular socket 16 is formed on the lower corner of said plate adjacent the lower end of the cut edge 13. A horizontally disposed shade member 17 is pivotally mounted in the sockets 14 and 15 and a slantingly disposed shade member 18 is pivotally mounted in the sockets 15 and 16.

The sockets 14, 15 and 16 are provided with slots on their sides for insertion of the hinge or pivot pins in each of the shade members 17 and 18 as shown in Fig. 4. Spring pockets 19 and 20 are respectively countersunk in the frame-plate 10 under the pivotal edge portions of said shade members and flat springs 21 and 22 that are slightly longer than said pockets are sprung into same so that they bulge exteriorly thereof as shown in the drawings. Now, when the shade members are installed in their sockets said springs bearing against their pivotal edge portions will hold them in place and always cause sufficient frictional tension to retain the shade members in whatever pivotal position they are placed as will be understood.

It will now be apparent that we have provided an eye shade of simple construction that will effectively cut out the objectionable glare of light rays. The larger shade member 18 eliminates the most objectionable light rays that come from the running lights of vehicles passing to the left. By reason of the slanting disposition of said shade member the field of vision may be readily increased or decreased by slightly tilting the head to the right or left. The two shade members may be cooperatively adjusted to meet different driving conditions and may be folded flat for carrying in a pocket case when not in use.

It will be understood that we do not confine ourselves to the exact details of construction shown in the drawings. We sometimes prefer to provide a greater slant for the shade member 18 than shown. The springs 21 and 22 are sometimes eliminated and sufficient friction is provided directly between the socket bearings and shade members to retain said shade members in any desired pivotal position. Instead of the two-way socket 15 we sometimes use two independent socket bearings placed close together. And we sometimes secure a skeleton frame-plate to the left rim 9 with a horizontal shade member similar to the shade member 17 pivoted thereto for shading the left eye from forward and overhead light rays.

Having thus described our invention, it being understood that minor changes may be resorted to without departing from the scope and spirit of the invention, what we claim and desire to secure by Letters Patent of the United States is:—

1. An eye shade for auto drivers comprising a frame, a frame-plate having a cut away portion with its lateral edge slanting downwardly and inwardly, a shade member pivotally mounted on the frame-plate adjacent and in parallel relation with said slanting edge, and means for retaining said shade member in different pivotal positions.

2. An eye shade for auto drivers comprising a frame, a frame-plate having a cut away portion with a horizontal upper edge and a lateral edge slanting downwardly and inwardly, a shade member pivotally mounted on the frame-plate adjacent and parallel with said horizontal edge, another shade member pivotally mounted adjacent and parallel with said slanting edge, and frictional means for retaining said shade members in different pivotal positions.

3. An eye shade for auto drivers comprising a frame, a frame-plate having a rounded inner end portion extending slightly beyond the center of the nose bridge of the frame, said frame-plate having a cut away portion with a horizontal upper edge and a lateral edge slanting downwardly and inwardly, a shade member pivotally mounted on the frame-plate adjacent and parallel with said slanting edge, another shade member pivotally mounted adjacent and parallel with said horizontal edge, and frictional means for retaining said shade members in different pivotal positions.

In witness whereof, we hereunto subscribe our names this 11th day of May A. D. 1928.

OLAF WESTGAARD.
LEVI WESTGAARD.